(12) United States Patent
Hirata et al.

(10) Patent No.: US 7,752,839 B2
(45) Date of Patent: Jul. 13, 2010

(54) EXHAUST EMISSION PURIFYING APPARATUS

(75) Inventors: Kiminobu Hirata, Ageo (JP); Nobuhiko Masaki, Ageo (JP); Masakazu Yano, Ageo (JP)

(73) Assignee: Nissan Diesel Motor Co., Ltd., Ageo-shi (JP)

( * ) Notice: Subject to any disclaimer, the term of this patent is extended or adjusted under 35 U.S.C. 154(b) by 0 days.

(21) Appl. No.: 12/027,243

(22) Filed: Feb. 6, 2008

(65) Prior Publication Data

US 2008/0127635 A1    Jun. 5, 2008

Related U.S. Application Data

(63) Continuation of application No. PCT/JP2006/315626, filed on Aug. 8, 2006.

(30) Foreign Application Priority Data

Sep. 22, 2005    (JP)    ............. 2005-274832

(51) Int. Cl.
*F01N 3/00*    (2006.01)

(52) U.S. Cl. ............. 60/286; 60/295; 60/296; 60/301; 60/303; 60/311; 422/172; 422/182

(58) Field of Classification Search ............. 60/286, 60/288, 295, 296, 297, 301, 303, 311; 422/169, 422/170, 172, 180, 182
See application file for complete search history.

(56) References Cited

U.S. PATENT DOCUMENTS

| | | | | |
|---|---|---|---|---|
| 5,601,792 | A | * | 2/1997 | Hug et al. ............. 422/169 |
| 6,312,650 | B1 | * | 11/2001 | Frederiksen et al. ........ 422/180 |
| 6,444,177 | B1 | * | 9/2002 | Muller et al. ............. 422/177 |
| 2002/0044897 | A1 | * | 4/2002 | Kakwani et al. ............. 422/172 |
| 2003/0108457 | A1 | * | 6/2003 | Gault et al. ............. 422/177 |
| 2003/0110763 | A1 | * | 6/2003 | Pawson et al. ............. 60/286 |
| 2006/0153748 | A1 | | 7/2006 | Huthwohl et al. | |

FOREIGN PATENT DOCUMENTS

| | | | |
|---|---|---|---|
| EP | 1050670 | A2 | 11/2000 |
| EP | 1262644 | A2 | 12/2002 |
| GB | 2381218 | A * | 4/2003 |
| GB | 2381218 | A * | 4/2003 |
| JP | 2000-27627 | A | 1/2000 |
| JP | 2000-510215 | | 8/2000 |
| JP | 2000-510215 | A | 8/2000 |

(Continued)

*Primary Examiner*—Binh Q Tran
(74) *Attorney, Agent, or Firm*—McDermott Will Emery LLP

(57) ABSTRACT

An exhaust emission purifying apparatus of the present invention has a casing that includes therein a plurality of layered passages which is formed by partitioning an inside of the casing to thereby allow an exhaust passage from an exhaust emission inlet to an exhaust emission outlet to be folded in its direction once or more, a reduction catalyst that reductively purifies NOx by using a reducing agent, a nozzle that injects the reducing agent or a precursor thereof to an exhaust upstream side of the reduction catalyst, and a filter (DPF) that collects PM suspended in an exhaust emission. The reduction catalyst and the filter are disposed in the different layered passages. Consequently, a more compact exhaust emission purifying apparatus having both NOx removal function and PM collection function can be provided.

5 Claims, 5 Drawing Sheets

FOREIGN PATENT DOCUMENTS

| | | | |
|---|---|---|---|
| JP | 2005155404 A | 6/2005 |
| WO | WO-97/43528 A1 | 11/1997 |
| WO | WO-01/42630 A2 | 6/2001 |
| WO | WO 01/42630 A2 | 6/2001 |
| WO | WO 03/036056 A1 | 5/2003 |
| WO | WO-03/036056 A1 | 5/2003 |
| WO | WO-2004/038192 A1 | 5/2004 |
| WO | WO 2004/038192 A1 | 5/2004 |

* cited by examiner

EXHAUST EMISSION PURIFYING APPARATUS

This application is a continuation of PCT/JP2006/315626, filed on Aug. 8, 2006.

BACKGROUND OF THE INVENTION

1. Field of the Invention

The present invention generally relates to an exhaust emission purifying apparatus for removing nitrogen oxides (NOx) contained in an exhaust emission and, more particularly, to an exhaust emission purifying apparatus in which a selective catalytic reduction (SCR) system is employed.

2. Description of the Related Art

As an exhaust emission purifying apparatus for removing NOx contained in an exhaust emission, an SCR-type exhaust emission purifying apparatus as disclosed in Japanese Laid-open (Kokai) Patent Application Publication No. 2000-27627 has been proposed.

In such an exhaust emission purifying apparatus, a reduction catalyst (NOx purification catalyst) is provided in an exhaust system, and a reducing agent is added to an upstream side in the exhaust stream (it will be hereinafter abbreviated as "exhaust upstream side" throughout the description) with respect to the reduction catalyst by injection from a nozzle, to thereby create a catalytic reduction reaction between NOx in the exhaust emission and the reducing agent in order to purify the NOx to harmless components. Such a reduction reaction is performed with ammonia which has high reactivity with NOx. As an reducing agent, not only a urea aqueous solution which easily produces ammonia by being hydrolyzed with heat and water vapor in the exhaust emission, but various types of reducing agents including a precursor, such as ammonia aqueous solution or hydrocarbons (HC), can be used.

In such an SCR-type exhaust emission purifying apparatus as mentioned above, the reduction catalyst and the nozzle for injecting the reducing agent or the precursor thereof to the exhaust upstream side of the reduction catalyst are arranged in series. In addition to this in-series arrangement of the reduction catalyst and the nozzle, if there is needed to further dispose a filter for trapping particulate matters (PM) suspended in the exhaust emission, a lengthwise size of the exhaust emission purifying apparatus which occupies that of the exhaust system becomes larger making it difficult to suitably design layout of on-vehicle components. Namely, to achieve the SCR-type exhaust emission purifying apparatus equipped with a PM collection function as well as a NOx removal function, with such a forethought in which a coming exhaust emission control will be further tightened, it is necessary to contrive a novel layout where the PM collection filter is provided in addition to the nozzle and the reduction catalyst, so as to minimize the entire apparatus.

SUMMARY OF THE INVENTION

With the above-mentioned necessities in view, an object of the present invention is to provide a more compact exhaust emission purifying apparatus equipped with both of the NOx removal function performed by the SCR and the PM collection function.

The present invention provides an exhaust emission purifying apparatus comprising: a casing that includes therein a plurality of layered passages which is formed by partitioning an inside of the casing to thereby allow an exhaust passage from an exhaust emission inlet thereof to an exhaust emission outlet thereof to be folded in its direction once or more; a reduction catalyst that reductively purifies nitrogen oxide by using a reducing agent; a nozzle that injects the reducing agent or a precursor thereof to an exhaust upstream side of the reduction catalyst; and a filter that collects a particulate matter suspended in an exhaust emission, wherein the reduction catalyst and the filter are disposed in the layered passages different from one another.

In a preferred aspect, the nozzle may be disposed in a folded passage portion of the exhaust passage and on a side located upstream of the exhaust stream therein, the folded passage portion being defined by a portion where folding of the exhaust passage occurs. More specifically, the nozzle may be disposed on an exhaust upstream side in the folded passage portion.

Further, the exhaust emission purifying apparatus according to the present invention may be further provided with an oxidation catalyst that is disposed in the exhaust passage on an exhaust upstream side with respect to the nozzle, thereby oxidizing nitrogen monoxide contained in the exhaust emission to nitrogen dioxide. Alternatively, the filter may be disposed on an exhaust upstream side with respect to the nozzle and configured to support thereon an oxidation catalytic substance that oxidizes nitrogen monoxide contained in the exhaust emission to nitrogen dioxide.

Still further, the exhaust emission purifying apparatus according to the present invention may be further provided with a reducing agent oxidation catalyst that is disposed in the exhaust passage on a downstream side of the exhaust stream with respect to the reduction catalyst, thereby oxidizing the reducing agent contained in the exhaust emission. Alternatively, the filter may be disposed on the downstream side of the exhaust stream with respect to the reduction catalyst and configured to support thereon a reducing agent oxidation catalytic substance that oxidizes the reducing agent contained in the exhaust emission.

According to the exhaust emission purifying apparatus of the present invention, since the nozzle, the reduction catalyst and the filter are appropriately disposed in the exhaust passage which is folded in its direction at least once to have a configuration such that a plurality of layered passage is folded in multi-layers inside the casing, this folded configuration of the exhaust passage allows the lengthwise size of the exhaust emission purifying apparatus which occupies that of the exhaust system to be reduced, and facilitates determination of the layout of on-vehicle components.

Further, since the nozzle is disposed on the exhaust upstream side in the folded passage portion, which is defined as the portion where the folding of the exhaust passage occurs, it is possible to obtain a desired distance from the reduction catalyst which is disposed on the exhaust downstream side of the folded passage portion. Accordingly, it is possible to obtain a suitable distance and time for achieving the uniform diffusion of the reducing agent or the precursor thereof in the exhaust emission and/or the hydrolysis of the same, before the reducing agent or the precursor thereof which is injected from the nozzle into the exhaust emission reaches the reduction catalyst.

Further, when the oxidation catalyst is disposed in the exhaust passage on the exhaust upstream side of the nozzle, reduction efficiency at the reduction catalyst can be improved by means of the oxidation effect of the NO achieved by the oxidation catalyst. Alternatively, the filter which is used to collect the PM may also be configured to have the function of the NO oxidation catalyst and disposed on the exhaust upstream side of the nozzle. This allows reduction in the number of components necessary for the exhaust emission purifying apparatus.

In addition, when the oxidation catalyst is disposed in the exhaust passage at a position located on the exhaust downstream side of the reduction catalyst, exhaustion of the excess reducing agent passing through the reduction catalyst can be prevented by means of the oxidation effect achieved by the oxidation catalyst. Alternatively, the filter which is used to collect the PM may also be configured to have the function of the reducing agent oxidation catalyst and disposed on the exhaust downstream side of the reduction catalyst. This allows reduction in the number of the components necessary for the exhaust emission purifying apparatus.

DESCRIPTION OF THE PREFERRED EMBODIMENTS

Figure 1:
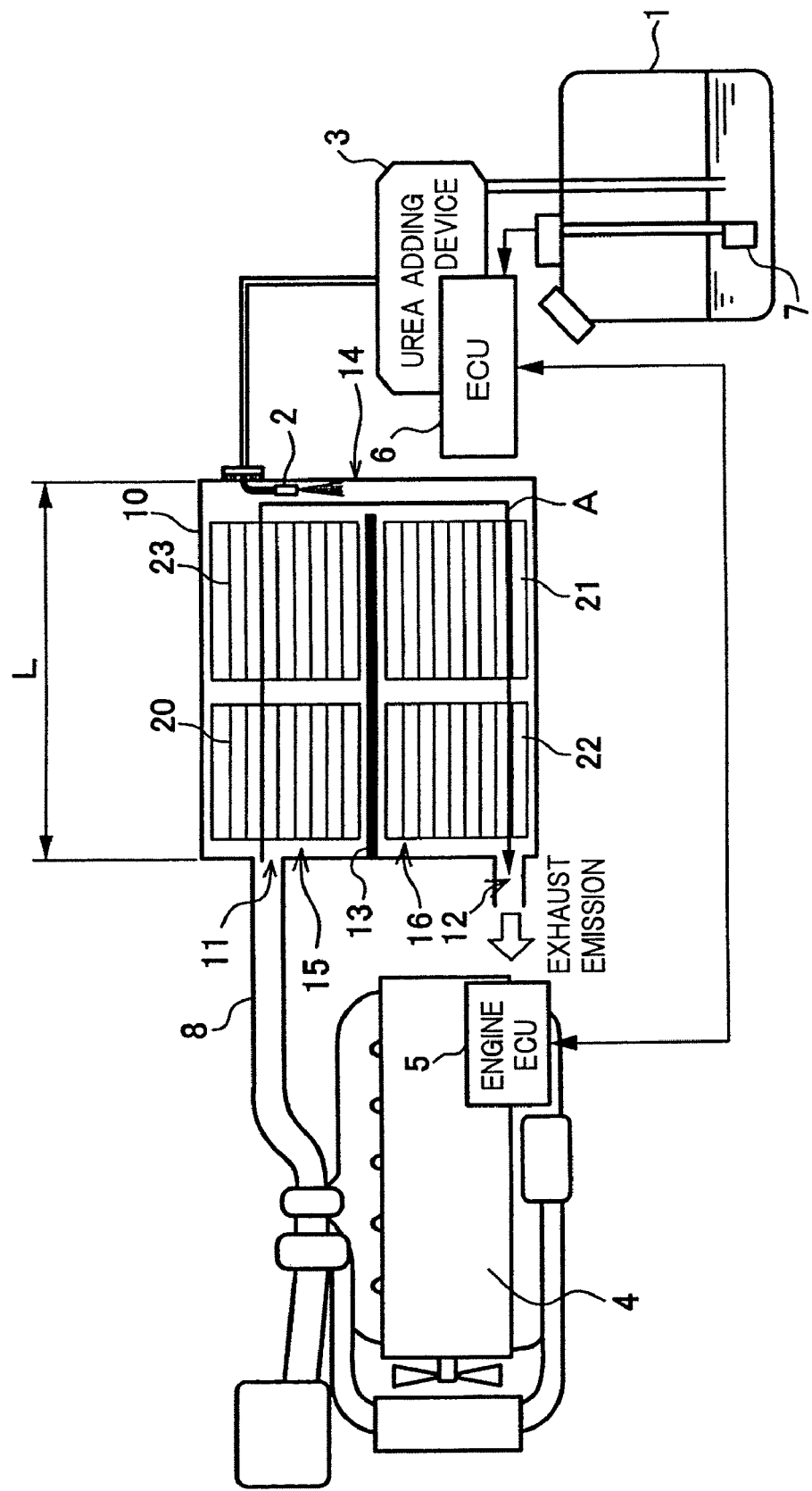
FIG. 1 is a schematic diagram of an exhaust emission purifying apparatus according to a first embodiment of the present invention.

FIGS. 1 through 5 illustrate each of embodiments of the present invention.

An SCR-type exhaust emission purifying apparatus according to each of the embodiments is provided with: an adding device 3 that supplies appropriate amount of a reducing agent or a precursor thereof (hereinbelow in the present embodiment, a urea aqueous solution is not exclusively employed for the brevity sake) from a tank 1 in which the urea aqueous solution is stored, to a nozzle 2; and an electronic control unit (ECU) 6 that controls a supplying operation of the adding device 3 in response to an exhaust heat, an engine rotating speed which is obtained by an ECU 5 of an engine 4, and the like. In the tank 1, a concentration sensor 7 for the urea aqueous solution is disposed in a suspended manner from the top to a position suitable for measuring concentration of the urea aqueous solution, for example, to a position near a bottom of the tank, and the concentration sensor 7 outputs a measurement signal to the ECU 6.

In each embodiment, a casing 10 is formed in a box-shape having rounded corners. An exhaust emission flows into the casing 10 from an exhaust emission inlet 11, which is connected with an exhaust pipe 8 led from an engine 4. The exhaust emission is then discharged from an exhaust emission outlet 12, which is formed on the same side surface as the exhaust emission inlet 11 is formed. In the casing 10, a compartment wall 13 is arranged to partition an inside of the casing 10 so that the exhaust passage from the exhaust emission inlet 11 to the exhaust emission outlet 12 is folded in its direction once. Namely, the compartment wall 13 divides the inside of the casing 10 into two chambers, that is, one chamber at the side of the exhaust emission inlet 11 and the other chamber at the side of the exhaust emission outlet 12, so that the two chambers are connected only by the folded passage portion 14. Thus, inside the casing 10, the exhaust passage is formed with the configuration having two layered passages 15, 16, which are folded to form layers superposed one on another but being connected to each other only by the folded passage portion 14.

Therefore, the exhaust emission flows, as indicated by an arrow A, from the exhaust emission inlet 11 into the upstream-side layered passage 15, and then turns at the folded passage portion 14, and further flows down the downstream-side layered passage 16, and is discharged from the exhaust emission outlet 12. Although only one folded passage portion 14 which is defined by the portion of the exhaust passage where folding in a direction of passageway occurs by the arrangement of the compartment wall 13, is illustrated in the figure, a plurality of layered passages may be formed by disposing the compartment walls in a labyrinth-like manner, for example, to increase the folded passage portion and increase the number of folds of the exhaust passage.

In the casing 10 in which the plurality of layered passages 15, 16 is formed by being folded in superposed layers by forming the folded exhaust passage with the compartment wall 13, because a reduction catalyst and a filter are appropriately arranged as described below, the lengthwise size L (see FIG. 1) of the exhaust emission purifying apparatus which occupies that of the exhaust system can be compact into approximately half in length than that of conventional constructions. In addition to such effect, mounting direction of the casing 10, such as whether mounted in a longitudinal or a transverse arrangement, can be freely designed according to the design choice of the mounting location thereof, so that this also allows an increase in a flexibility of design. Note that the term "a longitudinal arrangement" means the arrangement where the layered passages 15, 16 are juxtaposed up and down, and the term "a transverse arrangement" means the arrangement where the layered passages 15, 16 are juxtaposed front and rear or side by side.

In the exhaust emission purifying apparatus according to each illustrated embodiment, an oxidation catalyst 20 for increasing reduction efficiency by oxidizing NO in the exhaust emission into $NO_2$ is disposed at the most exhaust upstream side in the exhaust passage in the casing 10. In this connection, the exhaust emission purifying apparatus is configured such that, the exhaust emission which has been passed through the oxidation catalyst 20 is subjected to injection of the urea aqueous solution from the nozzle 2, and the exhaust emission added with an ammonia as a reducing agent passes through a reduction catalyst (NOx purification catalyst) 21, to thereby reductively purify NOx. In addition, in the exhaust emission purifying apparatus, a reducing agent oxidation catalyst 22 for oxidizing the ammonia passing through the reduction catalyst 21 is disposed on the exhaust downstream side of the reduction catalyst 21.

For each embodiment, in addition to these catalysts, a filter 23 for collecting PM is disposed in the layered passage 15 or 16 which is different from that in which the reduction catalyst 21 is disposed.

Note that since the oxidation catalyst 20 is an element for improving a NOx removal performance and the reducing agent oxidation catalyst 22 is an element for preventing exhaustion of ammonia, these are not essential for the NOx removal function and the PM collection function. Accordingly, at least the reduction catalyst 21 and the filter 23 are required to be appropriately disposed in the casing 10.

FIGS. 1 through 5 show layout variations of the catalysts 20 through 22 and the filter 23. The casing 10 is illustrated in a transverse type, in which the upstream-side layered passage 15 having the exhaust emission inlet 11 is at an upper side, the downstream-side layered passage 16 having the exhaust emission outlet 12 is at a lower side, and the folded passage portion 14 is positioned therebetween. In the illustrated example, the exhaust emission inlet 11 and the exhaust emission outlet 12 are arranged apart in upper and lower layers, however, the exhaust emission inlet 11 and the exhaust emission outlet 12 may be arranged adjacent to each other by arranging both of them to be positioned at the side of one of the upstream-side layered passage 15 and the downstream-side layered passage 16.

FIG. 1 shows the casing 10 according to a first embodiment of the present invention, in which the oxidation catalyst 20 and the filter 23 are arranged in series in this order along the upstream-to-downstream direction in the upstream-side layered passage 15, which is on the exhaust upstream side of the folded passage portion 14 provided by the compartment wall 13. Whereas, the reduction catalyst 21 and the reducing agent oxidation catalyst 22 are arranged in series in this order along the upstream-to-downstream direction in the downstream-side layered passage 16, which is on the exhaust downstream side of the folded passage portion 14 provided by the compartment wall 13.

The folded passage portion 14, which gives a passage for turning from the upstream-side layered passage 15 to the downstream-side layered passage 16, has a length substantially corresponding to the height of the casing 10. Consequently, by disposing the nozzle 2 on the exhaust upstream side in the folded passage portion 14, a desired distance between the nozzle 2 and the reduction catalyst 21 can be obtained. Thus, it is possible to obtain a suitable distance and time for achieving the uniform diffusion of the urea aqueous solution injected from the nozzle 2 into the exhaust emission and/or the hydrolysis of the same. Further, since the exhaust passage is arranged to be folded by the compartment wall 13, and since the reduction catalyst 21 and the filter 23 are disposed in the different layered passages 15 and 16, the length of the exhaust emission purifying apparatus which occupies that of the exhaust system in the lengthwise direction can be reduced into approximately half than that of the conventional one.

Figure 2:
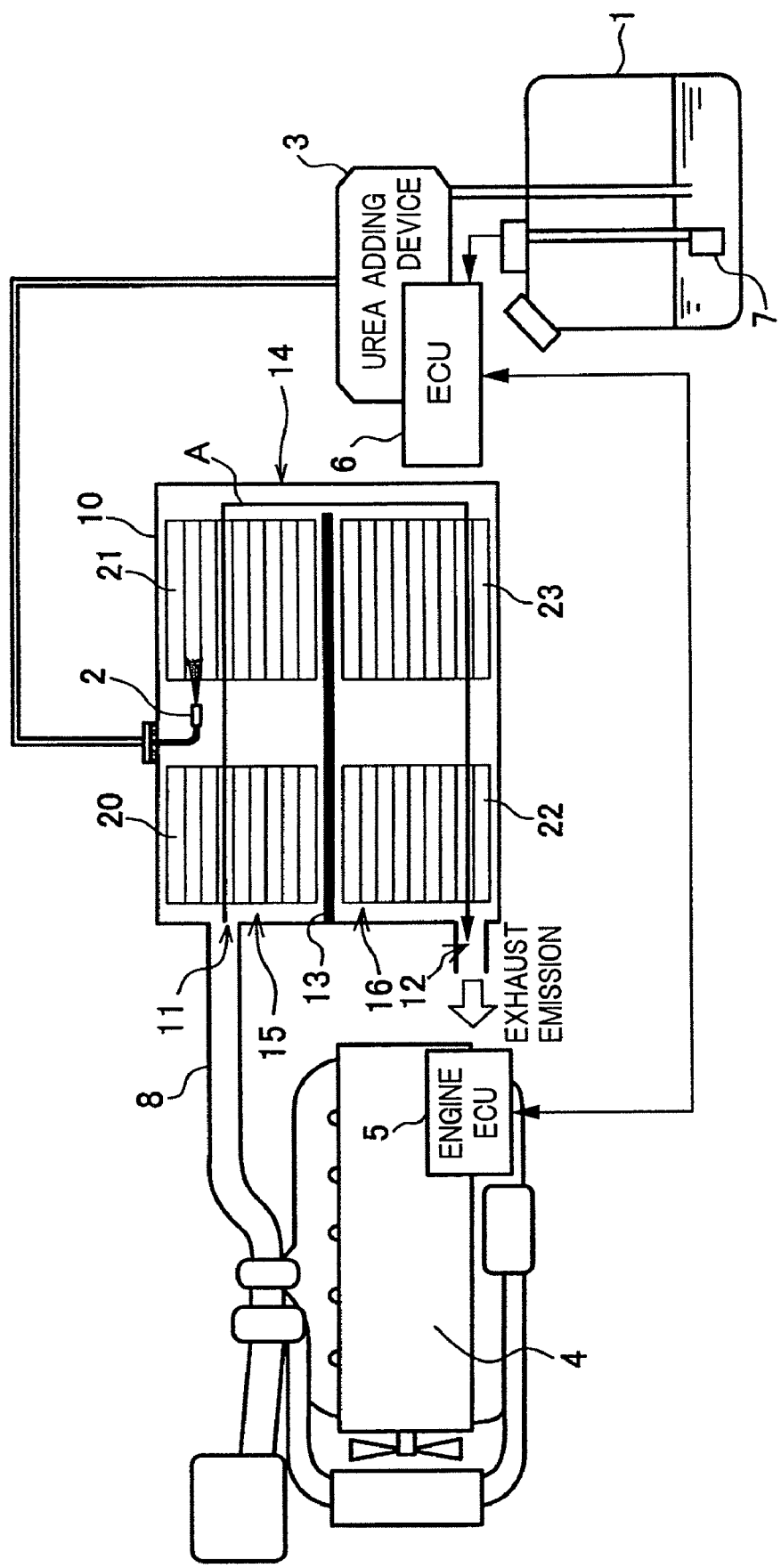
FIG. 2 is a schematic diagram of an exhaust emission purifying apparatus according to a second embodiment of the present invention.

FIG. 2 shows the casing 10 according to a second embodiment of the present invention, in which the oxidation catalyst 20 and the reduction catalyst 21 are arranged in series in this order along the upstream-to-downstream direction in the upstream-side layered passage 15. In the downstream-side layered passage 16, the filter 23 and the reducing agent oxidation catalyst 22 are arranged in series in this order along the upstream-to-downstream direction. The nozzle 2 is disposed between the oxidation catalyst 20 and the reduction catalyst 21 in the upstream-side layered passage 15.

Regarding the lengthwise size of the exhaust emission purifying apparatus which occupies that of the exhaust system, the second embodiment enjoys similar advantage as do in the first embodiment.

Figure 3:
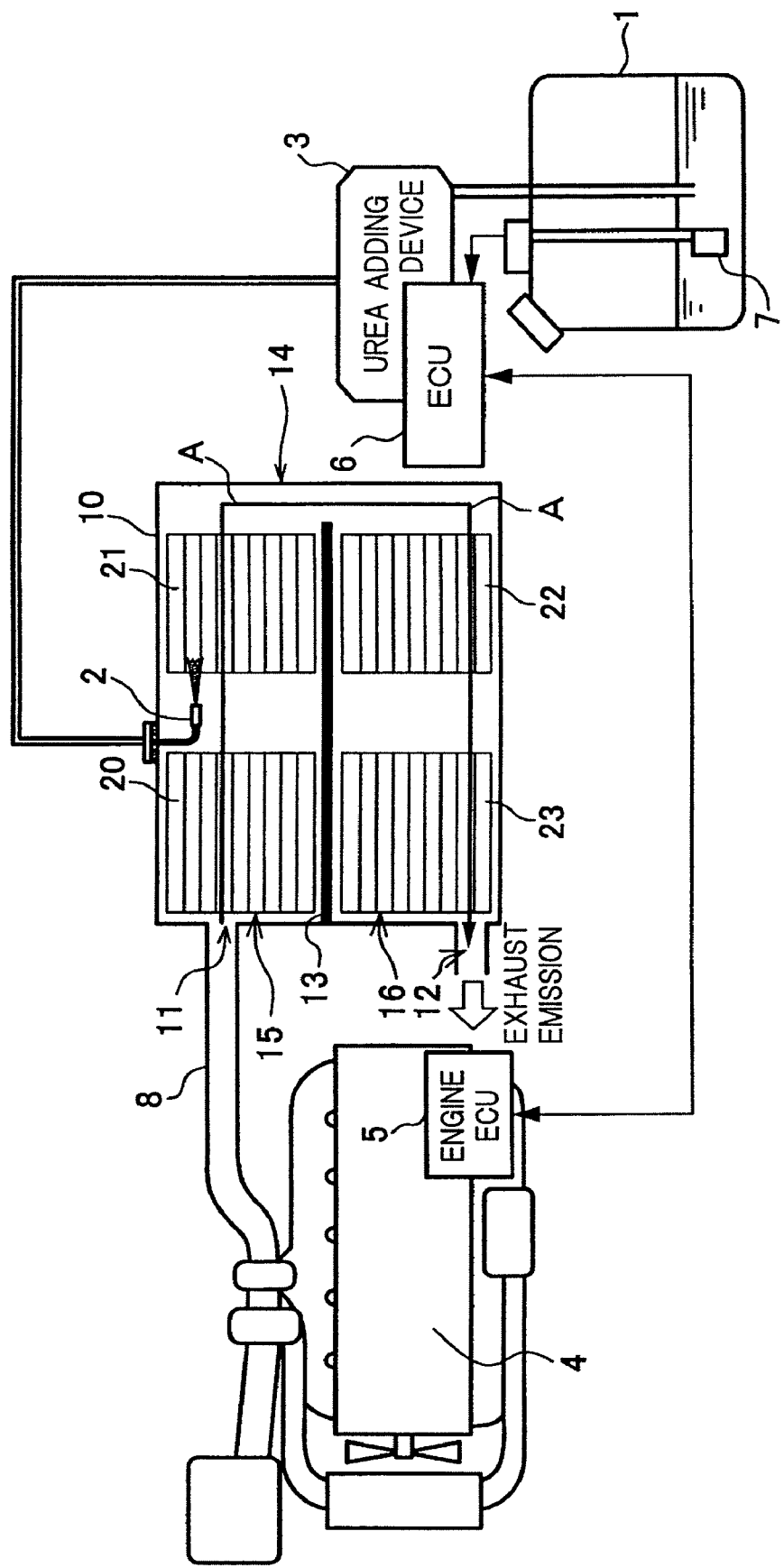
FIG. 3 is a schematic diagram of an exhaust emission purifying apparatus according to a third embodiment of the present invention.

FIG. 3 shows the casing 10 according to a third embodiment of the present invention, in which the oxidation catalyst 20 and the reduction catalyst 21 are arranged in series in this order along the upstream-to-downstream direction in the upstream-side layered passage 15, and the reducing agent oxidation catalyst 22 and the filter 23 are arranged in series in this order along the upstream-to-downstream direction in the downstream-side layered passage 16. The nozzle 2 is disposed between the oxidation catalyst 20 and the reduction catalyst 21 in the upstream-side layered passage 15.

The third embodiment, in which the position of the reducing agent oxidation catalyst 22 and the filter 23 is arranged in an inverse order to that of the second embodiment, enjoys a similar advantage as do in the second embodiment.

Figure 4:
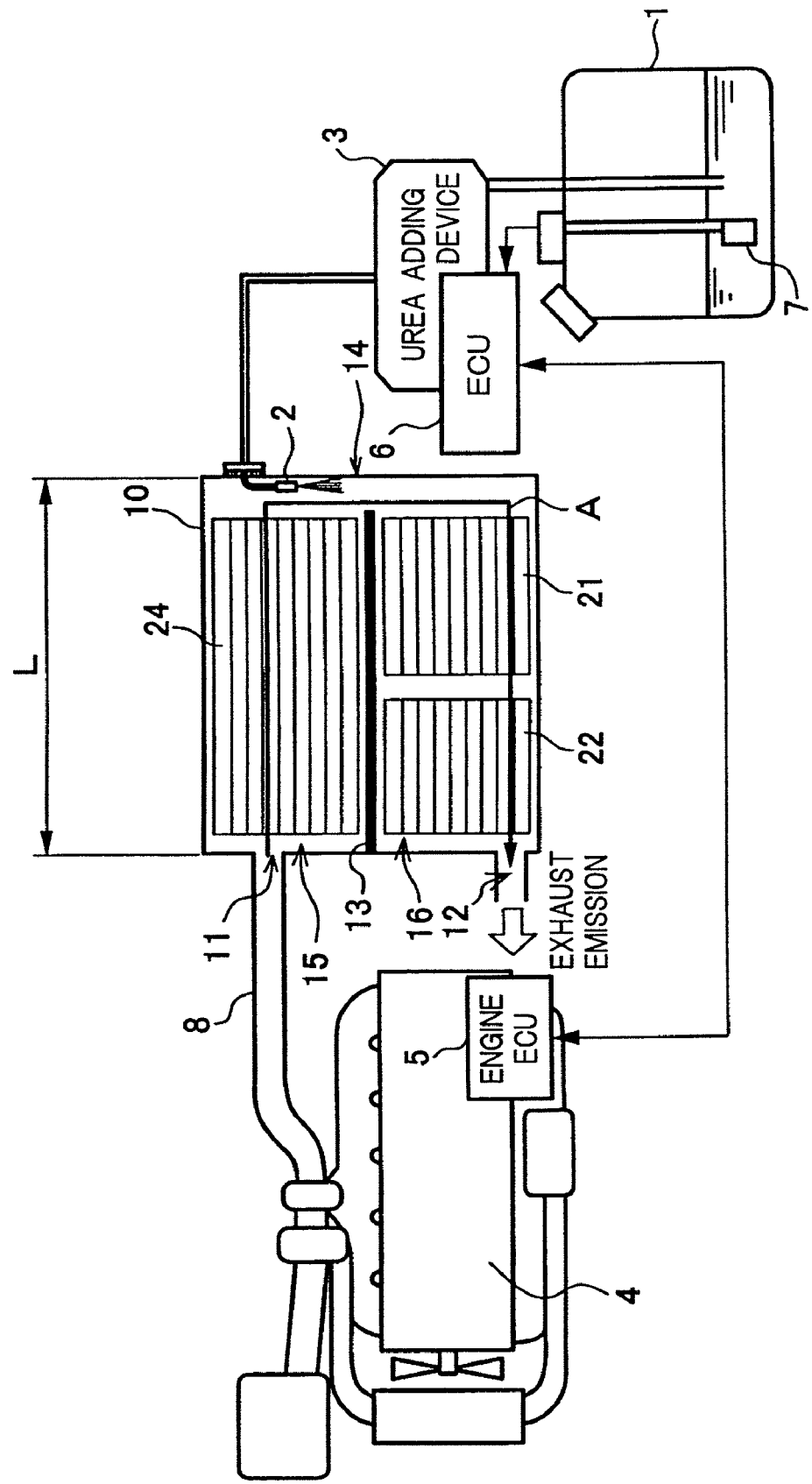
FIG. 4 is a schematic diagram of an exhaust emission purifying apparatus according to a forth embodiment of the present invention.

FIG. 4 shows an example of an arrangement according to a forth embodiment of the present invention, in which a filter 24 whose filtering function is combined with the function of the oxidation catalyst for oxidizing the NO is provided. The filter 24 can be formed by supporting and holding thereon an oxidation catalyst substance on the surface of the PM collecting filter. In the casing 10 of the forth embodiment, the filter 24 is disposed in the upstream-side layered passage 15, and the reduction catalyst 21 and the reducing agent oxidation catalyst 22 are arranged in series in this order along the upstream-to-downstream direction in the downstream-side layered passage 16. The nozzle 2 is disposed on the exhaust upstream side in the folded passage portion 14, to inject the urea aqueous solution to a position located on the exhaust upstream side of the reduction catalyst 21.

Since the nozzle 2 is disposed in the folded passage portion 14, the forth embodiment of the present invention can enjoy a similar advantage as do in the first embodiment. In addition, use of the oxidation-catalyst-cum-filter 24 allows the reduction in number of components.

Figure 5:
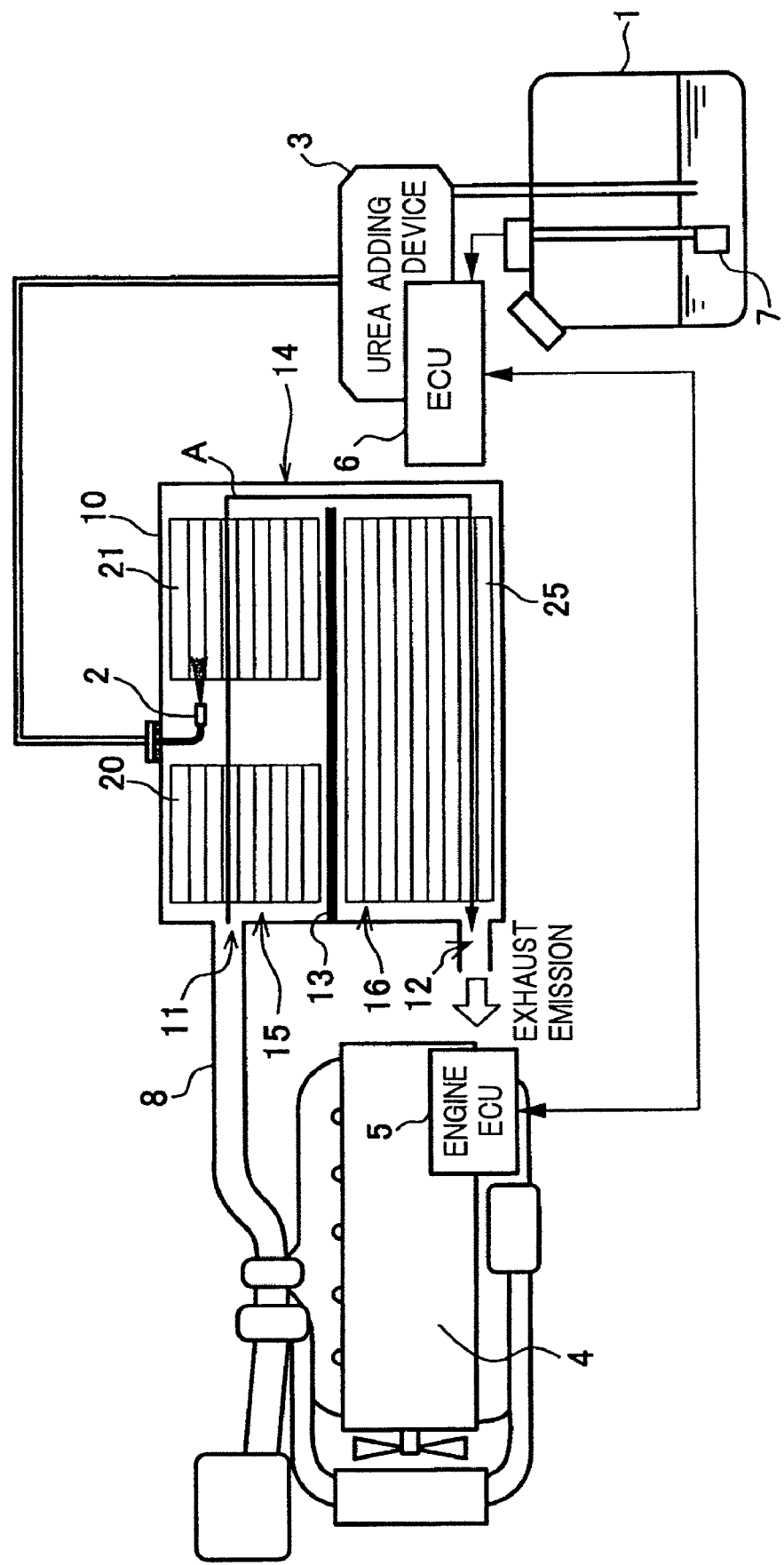
FIG. 5 is a schematic diagram of an exhaust emission purifying apparatus according to a first embodiment of the present invention.

FIG. 5 shows an example of arrangement according to a fifth embodiment of the present invention, in which a filter 25 whose filtering function is combined with the function of the reducing agent oxidation catalyst is provided. The filter 25 can be formed by supporting an oxidation catalyst substance of the ammonia on the surface of the PM collecting filter. In the casing 10 of the fifth embodiment, the oxidation catalyst 20 and the reduction catalyst 21 are arranged in series in this order along the upstream-to-downstream direction in the upstream-side layered passage 15, and the filter 25 is disposed in the downstream-side layered passage 16. The nozzle 2 is disposed between the oxidation catalyst 20 and the reduction catalyst 21 in the upstream-side layered passage 15.

According to the fifth embodiment, in addition to the similar advantage as in the second embodiment, use of the filter 25 combined with the function of the reducing agent oxidation catalyst allows reduction in number of components.

It should be appreciated that the entire contents of Japanese Patent Application No. 2005-274832, filed on Sep. 22, 2005, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

We claim:

1. An exhaust emission purifying apparatus, comprising:
   a box-shaped casing comprising a compartment wall arranged to partition an inside of the box-shaped casing into a plurality of chambers to form an exhaust passage from an exhaust emission inlet in a first chamber of the plurality of chambers to an exhaust emission outlet in a second chamber of the plurality of chambers, wherein the exhaust passage is folded in direction at least once;
   a reduction catalyst arranged in the exhaust passage of the box-shaped casing to reductively purify nitrogen oxide in an exhaust emission using a reducing agent;
   a nozzle arranged in the box-shaped casing to inject the reducing agent or a precursor thereof into the exhaust passage upstream from the reduction catalyst; and a filter arranged in the exhaust passage of the box-shaped casing to collect particulate matter suspended in the exhaust emission, wherein:

each of the plurality of chambers forms a respective layered passage of the exhaust passage, the layered passages of the exhaust passage are superposed one on another and adjacent layered passages of the exhaust passage are connected by a folded passage portion of the exhaust passage, the layered passages of the exhaust passage are juxtaposed up and down when the box-shaped casing is mounted in a longitudinal arrangement, the folded passage portion of the exhaust passage has a length substantially corresponding to a height of the box-shaped casing and the nozzle is arranged in an upstream side of the folded passage portion, and the reduction catalyst and the filter are arranged in different respective layered passages of the exhaust passage.

2. An exhaust emission purifying apparatus according to claim 1, further comprising, an oxidation catalyst that is disposed in the exhaust passage on an exhaust upstream side of the nozzle, thereby oxidizing nitrogen monoxide contained in the exhaust emission to nitrogen dioxide.

3. An exhaust emission purifying apparatus according to claim 1, wherein the filter is disposed on an exhaust upstream side of the nozzle and is configured to support thereon an oxidation catalytic substance that oxidizes nitrogen monoxide contained in the exhaust emission to nitrogen dioxide.

4. An exhaust emission purifying apparatus according to claim 1, further comprising, a reducing agent oxidation catalyst that is disposed in the exhaust passage on an exhaust downstream side of the reduction catalyst, thereby oxidizing the reducing agent contained in the exhaust emission.

5. An exhaust emission purifying apparatus according to claim 1, wherein the filter is disposed on an exhaust downstream side of the reduction catalyst and is configured to support thereon a reducing agent oxidation catalytic substance that oxidizes the reducing agent contained in the exhaust emission.

* * * * *